(12) United States Patent
Cococcetta et al.

(10) Patent No.: US 12,098,687 B2
(45) Date of Patent: Sep. 24, 2024

(54) METHOD AND SYSTEM FOR MANAGING AN ACTIVE SELECTIVE CATALYST REDUCTION DEVICE OF AN AFTER TREATMENT SYSTEM

(71) Applicant: FPT MOTORENFORSCHUNG AG, Arbon (CH)

(72) Inventors: Fabio Cococcetta, Zurich (CH); Dimitrios Tsinoglou, St. Gallen (CH)

(73) Assignee: FPT MOTORENFORSCHUNG AG, Arbon (CH)

( * ) Notice: Subject to any disclaimer, the term of this patent is extended or adjusted under 35 U.S.C. 154(b) by 0 days.

(21) Appl. No.: 18/031,097

(22) PCT Filed: Oct. 19, 2021

(86) PCT No.: PCT/IB2021/059617
§ 371 (c)(1),
(2) Date: Apr. 10, 2023

(87) PCT Pub. No.: WO2022/084850
PCT Pub. Date: Apr. 28, 2022

(65) Prior Publication Data
US 2023/0374950 A1     Nov. 23, 2023

(30) Foreign Application Priority Data

Oct. 19, 2020    (IT) .................. 102020000024646

(51) Int. Cl.
*F02D 41/02* (2006.01)
*F01N 3/20* (2006.01)
(Continued)

(52) U.S. Cl.
CPC ......... *F02D 41/0235* (2013.01); *F01N 3/208* (2013.01); *F01N 3/2892* (2013.01);
(Continued)

(58) Field of Classification Search
CPC ............ F02D 41/0235; F02D 13/0203; F02D 41/0007; F02D 41/064; F02D 41/38;
(Continued)

(56) References Cited

U.S. PATENT DOCUMENTS 9,057,309 B2 *  6/2015  Yezerets ................. F01N 3/208
9,169,754 B2   10/2015  Schneider et al.
(Continued)

FOREIGN PATENT DOCUMENTS

| EP | 2256311 | 12/2010 |
|----|---------|---------|
| EP | 3557016 | 10/2019 |

OTHER PUBLICATIONS

International Search Report and Written Opinion in corresponding International Patent Application No. PCT/IB2021/059617, mailed Nov. 26, 2021 (14 pages).

*Primary Examiner* — J. Todd Newton
(74) *Attorney, Agent, or Firm* — Leason Ellis LLP

(57) ABSTRACT

An ATS includes an SCR device and is connected to an internal combustion engine so as to receive an exhaust gas flow from at least one cylinder of the internal combustion engine when fuel is injected and combusted in such cylinder; an NH3 storage is increased in such SCR device after an engine shut off command has been detected, such that an increased NH3 storage is ready for a subsequent cold start of the internal combustion engine; the increase of NH3 storage is carried out by injecting a reducing agent in the ATS and by supplying an air flow towards the SCR device; such air flow flows through the cylinder after the fuel injection has been shut off.

11 Claims, 2 Drawing Sheets

(51) Int. Cl.
*F01N 3/28* (2006.01)
*F02B 37/10* (2006.01)
*F02B 37/16* (2006.01)
*F02B 75/02* (2006.01)
*F02D 13/02* (2006.01)
*F02D 41/00* (2006.01)
*F02D 41/06* (2006.01)
*F02D 41/38* (2006.01)
*F02M 26/13* (2016.01)
*F02N 11/08* (2006.01)

(52) U.S. Cl.
CPC .............. *F02B 37/10* (2013.01); *F02B 37/16* (2013.01); *F02D 13/0203* (2013.01); *F02D 41/0007* (2013.01); *F02D 41/064* (2013.01); *F02D 41/38* (2013.01); *F02M 26/13* (2016.02); *F02N 11/08* (2013.01); *F02B 2075/025* (2013.01); *F02D 2041/001* (2013.01)

(58) Field of Classification Search
CPC .. F02D 2041/001; F01N 3/208; F01N 3/2892; F01N 11/08; F02B 37/10; F02B 37/16; F02B 2075/025; F02M 26/13
See application file for complete search history.

(56) References Cited

U.S. PATENT DOCUMENTS

| | | |
|---|---|---|
| 2009/0000278 A1 | 1/2009 | Ichikawa et al. |
| 2013/0312407 A1* | 11/2013 | Surnilla ............. F02D 41/0055 60/605.1 |
| 2014/0223902 A1* | 8/2014 | Yacoub .................. F01N 3/208 60/288 |
| 2020/0040796 A1* | 2/2020 | Yoo ....................... F02D 41/402 |
| 2021/0054772 A1* | 2/2021 | Williams ............... F01N 3/222 |

* cited by examiner

METHOD AND SYSTEM FOR MANAGING AN ACTIVE SELECTIVE CATALYST REDUCTION DEVICE OF AN AFTER TREATMENT SYSTEM

CROSS-REFERENCE TO RELATED APPLICATIONS

This patent application is a U.S. National Phase Application under 35 U.S.C. § 371 of International Patent Application No. PCT/IB2021/059617, filed on Oct. 19, 2021, which claims priority from Italian patent application no. 102020000024646 filed on Oct. 19, 2020, all of which are incorporated herein by reference, as if expressly set forth in their respective entireties herein.

FIELD OF THE INVENTION

The present invention relates to a method for managing an active SCR (Selective Catalytic Reduction) device of an ATS (After Treatment System), in particular in the field of heavy vehicles.

DESCRIPTION OF THE PRIOR ART

Internal combustion engines, especially of the Diesel type, have an ATS (After Treatment System) including an active SCR device to neutralize NOx in the exhaust gas produced by such internal combustion engines.

The SCR devices are defined as "active" when the NH3 herein stored is used to neutralize NOx. Said NH3 is generated by thermolysis and subsequent hydrolysis of a liquid reducing agent, which is injected in the exhaust gas flow by means of a suitable dosing module.

In the present description with SCR device is meant an "active SCR device".

At a cold start of the engine, the main problem of the ATS is the great difficulty to thermolyze and subsequently hydrolyze the liquid reducing agent, in order to supply the ATS with NH3, because the heat content of the exhaust gas produced by the internal combustion engine is rather low, and insufficient to heat the components defining the ATS and to provide energy for the latent heat of the liquid reducing agent.

In spite of an inefficient hydrolyzation of the reducing agent, which leads to solid deposits in the dosing module, the SCR device anyway reaches its best operating conditions. Indeed the NH3 storage capacity of the SCR device decreases with the increase of its temperature.

In addition, the NH3 storage of the SCR device is usually limited, by a safety coefficient, in order to prevent NH3 slip during a sudden acceleration. Indeed, also the NH3 slip falls within the concept of engine emissions, thus it should be limited as much as possible.

The safety coefficient defines reduction values as a function of the temperature, such that a limiting curve is substantially similar to, and spaced from, a rated storage curve expressing the storage capacity as a function of the temperature.

The emission regulations are becoming more stringent, also with respect to cold start conditions. Therefore, the main trend of the manufacturers is the implementation of devices named NSC (NOx Storage Catalyst) or PNA (Passive NOx Adsorber), capable to catalyze or adsorb NOx as long as the active SCR device reaches its light off temperature.

However, NSC and PNA devices are unable to achieve high durability, in contrast with regulations. Therefore, there is the need of managing an active SCR device, in order to face engine cold start, without the implementation of additional NOx storage devices, such as NSC or PNA.

EP3557016 teaches to increase the NH3 storage when an engine shut off command is detected and the engine is no more active, such that said increased NH3 storage is ready for a subsequent engine cold start. In particular, an air flow is supplied towards the SCR device through an EGR pipe so as to bypass the engine.

Within this kind of solutions, there is the need to find advantageous alternatives with respect to the prior art solution disclosed in EP3557016, in particular to have a low number of components and/or a reduced space needed by such components, for reaching the desired NH3 storage increase at the engine shut off.

Therefore, aim of the present invention is to satisfy the above mentioned needs.

SUMMARY OF THE INVENTION

The aforementioned aim is reached by a method for managing an active SCR device of an ATS, as set forth in the present disclosure, and by a system as also disclosed herein.

In particular, according to the invention, when an engine shut off command is detected, the fuel injection of the engine is shut-off and an air flow is supplied towards the SCR device through at least one engine cylinder, while the reducing agent dosing module injects reducing agent, so as to increase the NH3 storage in the SCR device.

In this way, a variation of the ATS layout is not strictly needed. The air flow directed towards the SCR device flows through the engine, while the dosing module is active in the ATS.

According to a first embodiment of the invention, such air flow is supplied by compression in the engine cylinders, in particular thanks to an engine crankshaft driven (directly or indirectly) by an electric motor.

According to a second embodiment of the invention, the above mentioned air flow is supplied by an electrically driven supercharging compressor, provided at an intake line that channels air towards the engine cylinder. In a variant, the air flow is supplied by driving a turbine in the exhaust line so as to operate such turbine as a blower.

Thanks to the invention, the ATS and the engine do not need additional channeling means and/or additional blowers/compressors to circulate the air flow towards the ATS, while the dosing module is active and the fuel injection of the internal combustion engine is off.

Besides, the air supply and the reducing agent dosage are managed by a control unit in such a manner that the invention does not result in any pollutant emissions, particularly of NH3, during the operation after the engine shutoff command.

BRIEF DESCRIPTION OF THE DRAWINGS

The invention will become fully clear from the following detailed description, given by way of a mere exemplifying and non limiting example, to be read with reference to the attached drawings, wherein.

DETAILED DESCRIPTION OF THE PREFERRED EMBODIMENTS

Figure 1:
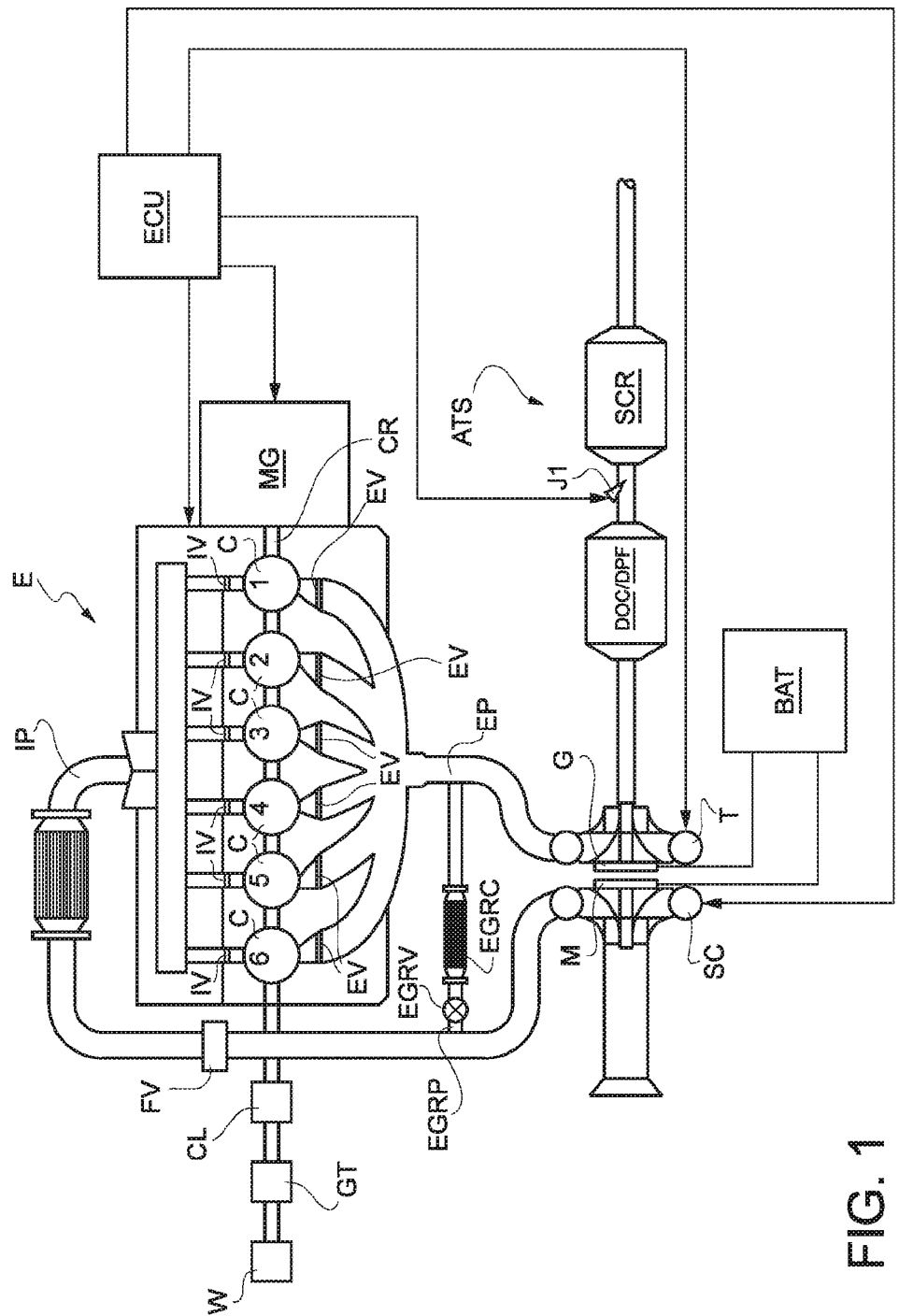
FIG. 1 shows a layout for carrying out preferred embodiments of the method for managing an active SCR device of an ATS, according to the present invention.

FIG. 1 schematically shows an internal combustion engine E comprising:
- at least one cylinder C, in particular four cylinders C respectively labeled as 1-4;
- an intake line IP coupled to the engine E in a known manner so as to channel air into the cylinders C through respective intake valves IV; and
- an exhaust line EP coupled to the engine E in a known manner so as to receive an exhaust gas flow from the cylinders C through respective exhaust valves EV, when fuel is injected and combusted in the cylinders.

The engine E can operate according to any cycle (e.g. a Diesel cycle).

An ATS is operatively connected to the exhaust line EP in order to perform a treatment on the exhaust gas to reduce pollutants before the release of the gas in the ambient atmosphere. The ATS comprises an SCR device, known per se. According to the particular embodiment shown in FIG. 1, the ATS further comprises a DOC (Diesel Oxidation Catalyst) and/or a DPF (Diesel Particulate Filter) arranged upstream of the SCR device, but the ATS could be different from what shown.

An engine control unit or ECU is implemented to control the operation of the engine E, in particular to control the fuel injection in the cylinders C. In particular, the ECU controls the operation of the valves IV and EV by means of VVA (Variable Valve Actuation). In addition, several sensors (not shown), including temperature sensors and NH3 and/or NOx sensors, are implemented. Usually at least one NOx sensor, and/or a NH3 sensor, are arranged downstream of the SCR device.

The ECU is programmed to further control a dosing module J1 on the basis of the signals received by said NH3 and/or NOx sensors and/or on the basis of at least one temperature signal, so as to inject a liquid reducing agent in the ATS, at the SCR device and/or upstream of the SCR device. In particular, an algorithm running in the ECU determines the optimum amount of NH3 storage in the SCR to achieve the desired NOx conversion during engine operation. The same algorithm also limits NH3 storage in the SCR, to prevent NH3 slip during a sudden acceleration.

Figure 2:
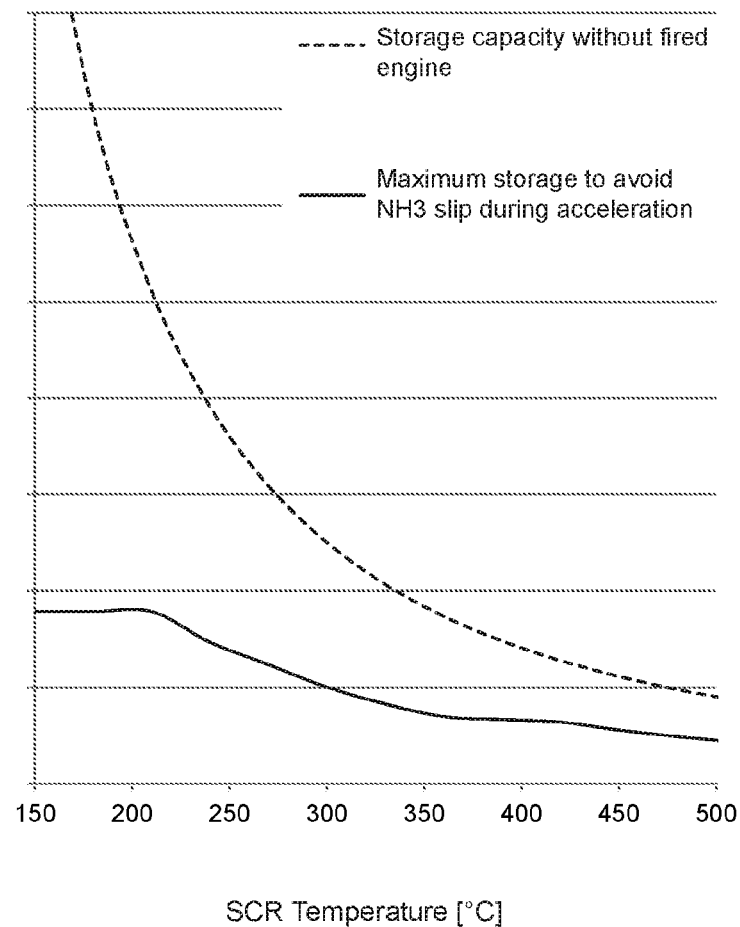
FIG. 2 shows a diagram disclosing the storage capacity curves in an SCR device: a rated curve (without fired engine) and a limited curve to avoid NH3 slip during engine acceleration.

FIG. 2 shows the NH3 storage capacity as a function of temperature of the SCR device. Two storage curves are indicated:
- a rated or maximum storage capacity, with engine not fired; when the engine is not fired, the NH3 storage capacity is higher than during the operating conditions, due to the higher partial pressure of NH3 in the exhaust stream;
- a limited storage capacity, set by design in order to avoid NH3 slip during engine acceleration (when engine is on).

The values of the limited storage capacity curve can be considered as targets of the NH3 storage in the SCR device when controlling the dosing module J1 during the normal operating conditions, i.e. when the engine E is on.

With reference again to FIG. 1, the intake line IP is provided with a supercharging compressor SC, that is driven by an electric motor M operated to supercharge the pressure of the fresh air entering into the cylinders C.

The intake line IP is further provided with a valve FV arranged between the compressor SC and the cylinders C. In Diesel engines, such valve FV is a throttling valve usually implemented to limit the intake passage at cold cycles, in order to increase pumping losses and shift the engine point so as to achieve a faster engine/ATS heating. In gasoline engines, the valve FV is the usual throttle valve implemented to dose the air mass entering the cylinders C for combustion of the fuel.

The exhaust line EP is provided with a turbine T, which has a shaft mechanically coupled to an electric machine G comprising a generator, electrically connected to a battery pack BAT to supply the latter with electrical energy. In turn, the battery pack BAT is electrically connected to the motor M, to supply the latter with electrical energy. In the particular example shown in FIG. 1, the electric machine G and the motor M are mechanically disconnected from each other, i.e. they are connected only electrically through the battery pack BAT, so as to be controlled and/or operated independently from each other.

In particular, the engine E is provided with a high pressure EGR system, so as to circulate part of the exhaust gas from the exhaust line EP to the intake line IP, in a point downstream of the compressor SC (considering the direction of the fresh air flow). The EGR system includes a pipe EGRP and a metering valve EGRV along the pipe EGRP. In particular, also a cooler EGRC is arranged along the pipe EGRP.

Irrespective of the presence of the EGR system, when the ECU detects a shut-off command (e.g. a key moved by a vehicle driver to an off-position), the fuel injection of the engine E is shut off, and the dosing module J1 is kept active or is activated, preferably with a modified storage target, in order to achieve an NH3 enrichment in the SCR device.

In particular, during this NH3 enrichment by means of the dosing module J1, the NH3 storage target can be increased with respect to the limited storage curve that can be seen in the lower area of FIG. 2, so as to approach the rated storage curve in the upper area of the same FIG. 2.

The engine E comprises a crankshaft CR that is connected to a transmission shaft by a gear transmission GT and/or by a clutch CL, while the transmission shaft is suitable to drive vehicle wheels W.

The engine crankshaft CR is coupled to an electric machine MG, directly or via a transmission (not shown). The electric machine is defined by an electric motor-generator or an electric motor. According to a preferred variant, the electric machine MG is integrated in a member of the clutch CL.

According to a first preferred embodiment of the invention, the crankshaft can be kept in rotation even when the fuel injection is shut off, if needed, thanks to the electric machine MG. Indeed, after having shut off the fuel injection in response to the shut off command, the engine E is driven by the electric machine MG so as to use the engine cylinders C as a compressor, to supply an air flow towards the SCR device and therefore to hydrolyze the reducing agent injected by the dosing module J1, in order to increase the NH3 storage in such SCR device as mentioned above.

When the engine E is driven by the electric machine MG in this off-condition, the crankshaft CR has to be disconnected from the wheels W. According to a preferred example, the transmission GT has gears that can be engaged by actuators under the control of a control unit (e.g. the ECU), and the shut-off command automatically causes the engagement/selection, in such transmission GT, of a neutral or parking condition, so as to automatically disconnect the engine crankshaft CR from the wheels W. According to a variant, as an alternative or in combination with the neutral or parking condition, the clutch CL is actuated under to control of a control unit (e.g. the ECU) and the shut-off command automatically causes the disengagement of the clutch CL. If an automatic disconnection from the wheels W is not provided, a manual disconnection has to be carried out by the vehicle driver: in this case, the electric machine MG is operated to drive the engine E and supply the air flow towards the SCR device only if a disconnection between the crankshaft CR and the wheels W has been detected.

With this first embodiment, the compressor SC and/or the turbine T could be irrelevant, and they are preferably bypassed by the air flow generated when the engine E is used as a compressor. By way of example, a by-pass line (not shown) is provided at the intake line IP and/or at the exhaust line EP. In particular, the air flow in the by-pass line is inhibited or allowed by switching at least one valve (not shown). In this way, it is possible to avoid a restriction in the flowrate (i.e. an undesired pressure drop) at the compressor SC and/or at the turbine T when the engine E is used as a compressor.

Within this first preferred embodiment, preferably, the valves IV and EV are operated by the VVA, i.e. by an electrically driven system that is controlled to adjust the timing of opening and closing of such valves IV and EV. The VVA is adjusted when the engine E is operated as a compressor, to reach a valve timing configuration different from the ones set during the normal operations of the engine E. In particular, the VVA is adjusted so as to operate the engine E as a two-stroke reciprocating machine (and no more as a four-stroke reciprocating machine), in order to suck air along an intake stroke and to compress air along a following compression stroke.

According to a second preferred embodiment, after having shut off the fuel injection, the crankshaft CR stops and therefore is not rotating, and an air flow is supplied towards the SCR device by operating the motor M so as to drive the compressor SC and to use such compressor SC as a blower. In this case, at least one passage is to be provided through the intake valves IV and the exhaust valves EV for at least one cylinder C. For this purpose, at least one of the valves IV and/or EV is controlled to be opened, if it is actually closed at the stop of the crankshaft CR and inhibits the air passage, e.g. before operating the motor M to drive the compressor SC.

As an alternative or in combination with the operation of the motor M, in order to generate an air flow through the cylinders C and towards the SCR device, the electric machine G is defined by a motor-generator (instead of being defined only by a generator) and is operated to drive in rotation the turbine T while the crankshaft CR is not rotating, so as to use such turbine T as a blower suctioning an air flow through the engine cylinders C and the intake line IP. Also in this case, a passage is to be formed through at least one engine cylinder C by opening at least one of the valves IV and EV, if such passage is not actually provided (e.g. accidentally) when the crankshaft CR stops its rotation. In particular, the valves IV and EV are operated by the VVA which is adjusted to define the above mentioned passage and allow airflow circulation from the intake line IP to the exhaust line EP through the engine cylinders C even when the engine E is completely off (i.e. when the fuel injection is shut off and the crankshaft CR is not rotating).

The best option is to drive both the compressor SC and the turbine T, simultaneously, so as to have two blowers arranged in series for reaching a higher pressure. If only the compressor SC is driven or only the turbine T is driven to generate the air flow towards the SCR device, a by-pass line together with a corresponding valve (not shown) can be provided to bypass the turbine T or, respectively, the compressor SC, just as mentioned above for the first embodiment, to avoid pressure drops.

According to a variant, the engine E is driven as a compressor by the electric machine MG, and in the meantime the compressor SC and the turbine T are driven as blowers, so as to obtain three compression stages supplying the air flow towards the SCR device.

For any of the previous embodiments, preferably the pipe EGRP is kept closed. Therefore, fresh air is supplied towards the SCR device, through the cylinder of the engine E, without affecting the EGR system.

For any of the previous embodiments, preferably the valve FV is controlled to be opened, if it is actually closed at the shut off of the fuel injection, so as to avoid pressure drops at such valve FV when the air flow is supplied through the engine E towards the SCR device. As an alternative (not shown), a by-pass line with a corresponding valve is provided, in such a manner that the air flow supplied towards the SCR device bypasses the valve FV.

For any of the previous embodiments, a continuous control of the NH3 enrichment is preferably carried out, on the basis of the ATS temperature and/or the engine temperature, to interrupt or inhibit the procedure when such temperature is lower than a given threshold, e.g. when the waste heat is not enough to provide for the hydrolyzation.

Besides, in use, the NH3 stored in the SCR device at the end of a hot mission mainly depends on the average temperature of the SCR device before and at the time of the engine shut off. A too high temperature could not allow a sufficient NH3 storage to tackle NOx emissions when a "cold" cycle has to be performed by the engine E at the next start.

Therefore, according to a variant, the beginning of the NH3 storage increase is postponed to the time in which the ATS temperature or an engine temperature has become lower than a further given threshold. In particular, the NH3 increase is carried out if the detected temperature is within a predetermined temperature range.

Alternatively, the air compression is activated, and the reducing agent dosing module J1 is activated or continues to be activated, just at the time in which the fuel injection is shut-off.

In parallel with the above controls, preferably the injection of the reducing agent is carried out until the above mentioned storage target is reached.

Preferably, the SCR device is arranged to be always crossed by the exhaust gas produced by the internal combustion engine during combustion of the fuel. This means that preferably the SCR device is arranged directly along the exhaust line EP, and not on a possible bypass line.

It should be evident that the method described above can be implemented advantageously thanks to a computer program in a computer-readable medium, comprising program code means for performing the claimed method, when such program is run on a control unit such as the ECU.

Besides, it should be clear that modifications can be made to the method and system described above, without extending beyond the scope of protection defined by the appended claims.

In particular, the method and system of the present invention could be implemented in engines that are not installed on vehicles.

The invention claimed is:

1. Method for managing an active Selective Catalyst Reduction device of an After Treatment System, which is connected to an internal combustion engine to receive an exhaust gas flow from at least one cylinder of said internal combustion engine when fuel is injected and combusted in said at least one cylinder; the method comprising the step of increasing an NH3 storage in the Selective Catalyst Reduction device after an engine shut off command has been detected, such that an increased NH3 storage is ready for a subsequent cold start of the internal combustion engine; wherein the step of increasing the NH3 storage is carried out by injecting a reducing agent in the After Treatment System and by supplying an air flow towards the Selective Catalyst Reduction device; wherein said air flow flows through said at least one cylinder after the fuel injection has been shut off; wherein said internal combustion engine comprises a crankshaft coupled to an electric machine comprising a first electric motor; and wherein said air flow is supplied by driving said crankshaft by said first electric motor.

2. Method for managing an active Selective Catalyst Reduction device of an After Treatment System, which is connected to an internal combustion engine to receive an exhaust gas flow from at least one cylinder of said internal combustion engine when fuel is injected and combusted in said at least one cylinder; the method comprising the step of increasing an NH3 storage in the Selective Catalyst Reduction device after an engine shut off command has been detected, such that an increased NH3 storage is ready for a subsequent cold start of the internal combustion engine; wherein the step of increasing the NH3 storage is carried out by injecting a reducing agent in the After Treatment System and by supplying an air flow towards the Selective Catalyst Reduction device; wherein said air flow flows through said at least one cylinder after the fuel injection has been shut off, wherein a turbine is arranged between said internal combustion engine and said After Treatment System, the turbine being mechanically coupled to a further electric machine defining a motor-generator; and wherein said air flow is supplied by driving said turbine by said further electric machine.

3. Method according to claim 2, wherein said internal combustion engine comprises:
  a crankshaft;
  intake and exhaust valves operated by Variable Valve Actuation to manage air inflow into said at least one cylinder and, respectively, gas outflow from said at least one cylinder;
  and wherein said crankshaft is not rotating, and said air flow flows through a passage that is formed in said internal combustion engine by adjusting said Variable Valve Actuation to open at least one of said intake and exhaust valves.

4. Method for managing an active Selective Catalyst Reduction device of an After Treatment System, which is connected to an internal combustion engine to receive an exhaust gas flow from at least one cylinder of said internal combustion engine when fuel is injected and combusted in said at least one cylinder; the method comprising the step of increasing an NH3 storage in the Selective Catalyst Reduction device after an engine shut off command has been detected, such that an increased NH3 storage is ready for a subsequent cold start of the internal combustion engine; wherein the step of increasing the NH3 storage is carried out by injecting a reducing agent in the After Treatment System and by supplying an air flow towards the Selective Catalyst Reduction device; wherein said air flow flows through said at least one cylinder after the fuel injection has been shut off, wherein an intake line is coupled to said internal combustion engine so as to channel air to said at least one cylinder, the intake line being provided with a supercharging compressor coupled to a second electric motor; and wherein said air flow is supplied by driving said supercharging compressor as a blower by said second electric motor.

5. Method according to claim 4, wherein a turbine is arranged between said internal combustion engine and said After Treatment System, the turbine being mechanically coupled to a further electric machine defining a motor-generator; and wherein said air flow is supplied by driving said turbine as a blower by said further electric machine, simultaneously with driving said supercharging compressor.

6. Method according to claim 1, wherein an intake line is coupled to said internal combustion engine so as to channel air to said at least one cylinder, the intake line being provided with a valve; and wherein said valve is controlled to be opened so that said air flow flows through said valve.

7. Method according to claim 1, wherein an Exhaust Gas Recirculation system is provided with an Exhaust Gas Recirculation pipe to circulate exhaust gas from an exhaust line to an intake line when fuel is injected and combusted in at least one cylinder, and wherein the Exhaust Gas Recirculation pipe is kept closed when said air flow is supplied.

8. Method according to claim 1, wherein said dosing module is controlled according to a limited NH3 storage target, that is lower than a rated NH3 storage capacity, before detection of said shut off command, in order to avoid NH3 slip during an engine acceleration, and wherein the increase of the NH3 storage in the Selective Catalyst Reduction device is carried out to reach a modified target, that is higher than the limited NH3 storage target and lower than, or equal to, said rated NH3 storage capacity.

9. System comprising:
  an internal combustion engine comprising at least one cylinder and a crankshaft coupled to an electric machine comprising a first electric motor,
  an intake line for channeling air towards said at least one cylinder;
  an exhaust line for receiving an exhaust gas flow from said at least one cylinder when fuel is injected and combusted in said at least one cylinder;
  an After Treatment System connected to said exhaust line and comprising an active Selective Catalyst Reduction device;
  a turbine arranged between said internal combustion engine and said After Treatment System, the turbine being mechanically coupled to an a further electric machine defining a motor-generator;
  an intake line coupled to said internal combustion engine so as to channel air to said at least one cylinder, the intake line being provided with a supercharging compressor coupled to a second electric motor;
  a dosing module for injecting a reducing agent in the After Treatment System;
  an electronic control unit configured to increase an NH3 storage in the Selective Catalyst Reduction SCR device after an engine shut off command has been detected, such that an increased NH3 storage is ready for a subsequent cold start of the internal combustion engine, by controlling at least one of said first electric motor, said motor-generator and said second electric motor, supply an air flow flowing through at least one cylinder after the fuel injection has been shut off.

10. Method according to claim 1, wherein said internal combustion engine comprises intake and exhaust valves operated by Variable Valve Actuation to manage air inflow into said at least one cylinder and, respectively, gas outflow from said at least one cylinder; and wherein said Variable Valve Actuation is adjusted before or during activation of said first electric motor so as to operate the internal combustion engine as a two-stroke reciprocating machine.

11. Method according to claim 10, wherein the internal combustion engine is automatically disconnected from a transmission shaft suitable to drive vehicle wheels, following to the detection of said shut-off command and before driving said crankshaft.

\* \* \* \* \*